(12) United States Patent
Parenti

(10) Patent No.: US 9,914,411 B2
(45) Date of Patent: Mar. 13, 2018

(54) SECURE ATTACHMENT

(71) Applicant: Steve Parenti, Newark, CA (US)

(72) Inventor: Steve Parenti, Newark, CA (US)

( * ) Notice: Subject to any disclaimer, the term of this patent is extended or adjusted under 35 U.S.C. 154(b) by 0 days.

(21) Appl. No.: 15/619,011

(22) Filed: Jun. 9, 2017

(65) Prior Publication Data

US 2017/0274842 A1    Sep. 28, 2017

Related U.S. Application Data

(63) Continuation-in-part of application No. 14/814,298, filed on Jul. 30, 2015, now Pat. No. 9,744,923, which is a continuation-in-part of application No. 14/273,968, filed on May 9, 2014, now Pat. No. 9,283,904.

(51) Int. Cl.
*B60R 13/10* (2006.01)
*F16B 43/00* (2006.01)
*F16B 41/00* (2006.01)

(52) U.S. Cl.
CPC .......... *B60R 13/105* (2013.01); *F16B 41/005* (2013.01); *F16B 43/001* (2013.01)

(58) Field of Classification Search
CPC ........ F16B 37/14; F16B 41/005; B60R 13/10; B60R 13/105
USPC ........ 411/429, 372.5, 910; 40/201, 207, 208
See application file for complete search history.

(56) References Cited

U.S. PATENT DOCUMENTS

| 1,928,876 A | * | 10/1933 | Bergander | B60R 13/105 |
| | | | | 292/307 B |
| 2,020,522 A | * | 11/1935 | Seguin | F16B 37/14 |
| | | | | 292/307 B |
| 2,054,468 A | * | 9/1936 | Pothier | B60R 13/105 |
| | | | | 40/203 |
| 2,103,743 A | * | 12/1937 | Doty | B60R 13/105 |
| | | | | 24/662 |
| 5,630,687 A | * | 5/1997 | Robinson | F16B 41/005 |
| | | | | 411/372.6 |
| 6,053,683 A | * | 4/2000 | Cabiran | F16B 37/14 |
| | | | | 411/372.6 |
| 6,176,255 B1 | * | 1/2001 | Robinson | F16B 37/14 |
| | | | | 137/327 |
| 6,385,876 B1 | * | 5/2002 | McKenzie | B60R 13/10 |
| | | | | 40/201 |

(Continued)

*Primary Examiner* — Flemming Saether
(74) *Attorney, Agent, or Firm* — Douglas L. Weller

(57) ABSTRACT

An automobile license plate attachment device includes a wheel part that includes a slot located between two ridges at an outer circumference of the wheel part. A fastener attaches the wheel part over a license plate. An externally threaded structure is shaped to fit over and cover the wheel part when the wheel part is attached over the license plate. The externally threaded structure includes at least one screw hole into which a headless socket screw can be attached to extend into the slot of the wheel part. The headless socket screw holds the externally threaded structure to the license plate. An internally threaded structure with threads matched allows screwing the internally threaded structure on the externally threaded structure. The externally threaded structure includes a slot into which a tool may be placed to prevent the externally threaded structure from spinning around the wheel part when the internally threaded structure is screwed on and off the externally threaded structure.

16 Claims, 8 Drawing Sheets

(56) References Cited

U.S. PATENT DOCUMENTS

| | | | |
|---|---|---|---|
| 8,523,504 B1* | 9/2013 | Hill | B60R 13/105 411/374 |
| 2007/0289175 A1* | 12/2007 | Blodgett, Jr. | G09F 7/18 40/201 |

* cited by examiner

SECURE ATTACHMENT

BACKGROUND

Tamper proof "security screws" and nuts have been used to prevent or frustrate vandals and petty thieves. These are used, for example, to secure wheel rims to automobiles or protect against unauthorized removal of license plates. Some security screws rely upon a screw head having an unusual shape that requires a special tool to be used. Other security screws may have an asymmetric one-way, clutch head design that allows for easy attachment but not for removal. Alternatively, a threaded cap requiring a special tool to remove the cap may be used to hinder access to a traditional screw, as shown for example in D621,254S.

DESCRIPTION OF THE EMBODIMENT

A license plate attachment device includes a cap that covers a nut or a screw used to attach a license plate to an automobile or to a frame attached to an automobile. An anchor bearing anchors the license plate to the automobile or frame so that an outer periphery of the anchor bearing rotates freely while the anchor bearing is held tightly in place on the automobile or frame. The anchor bearing has a slot located at the outer periphery. The cap is secured to the anchor bearing using a first headless socket screw and a second headless socket screw. A socket size of the first headless socket screw is different than a socket size of the second headless socket screw.

For example, the first headless socket screw is a hex socket headless screw and the second headless socket screw is a hex socket headless screw.

In one implementation, the first headless socket screw is placed in a first treaded hole in the cap to allow securing the cap to the anchor bearing. The second headless socket screw is placed in a second treaded hole in a ring to allow securing the ring to the cap. For example, the cap includes external screw threads and the ring has internal screw threads that match the external screw threads of the cap so that so that ring can be screwed onto the cap.

In another implementation, the first headless socket screw is placed in a first treaded hole in the cap to allow securing the cap to the anchor bearing and the second headless socket screw is also placed in a second treaded hole in the cap to allow securing the cap to the anchor bearing.

For example, when a frame attached to the automobile is used, the frame has a first hole and a second hole spaced and configured to match locations for attaching a license plate on an automobile. The frame also includes a plurality of screws configured to match locations for attachment holes of the license plate.

Figure 1:
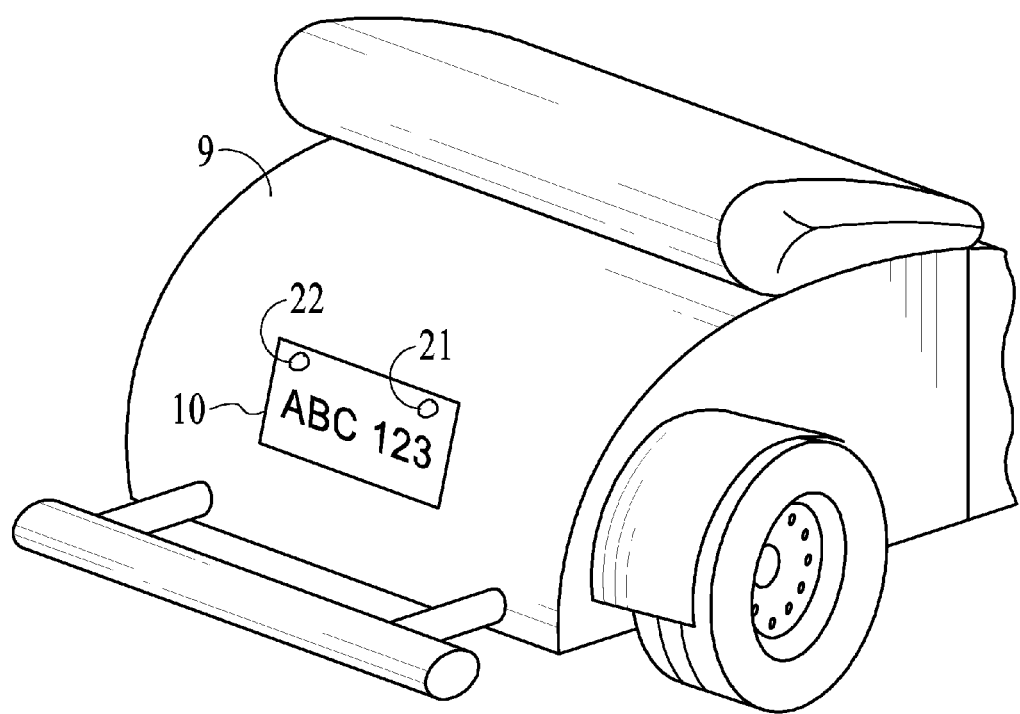
FIG. 1 shows a license plate securely attached to an automobile in accordance with an implementation.

FIG. 1 shows a license plate 10 securely attached to an automobile 9 using screws covered by a security cover 21 and a security cover 22.

Figure 2:
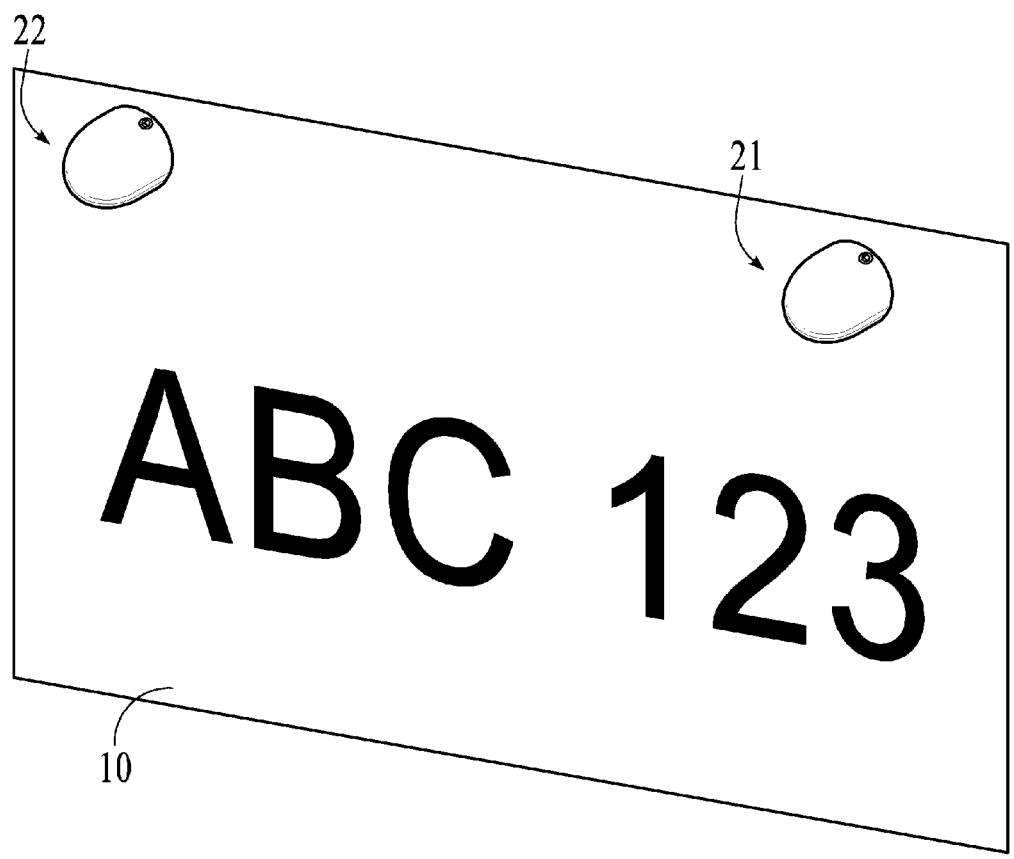
FIG. 2 shows security covers being used to securely attach a license plate to an automobile in accordance with an implementation.

FIG. 2 shows additional details of security cover 21 as assembled. Particularly, a cap 12 spins freely when security cover 21 is attached to automobile 9

Figure 3:
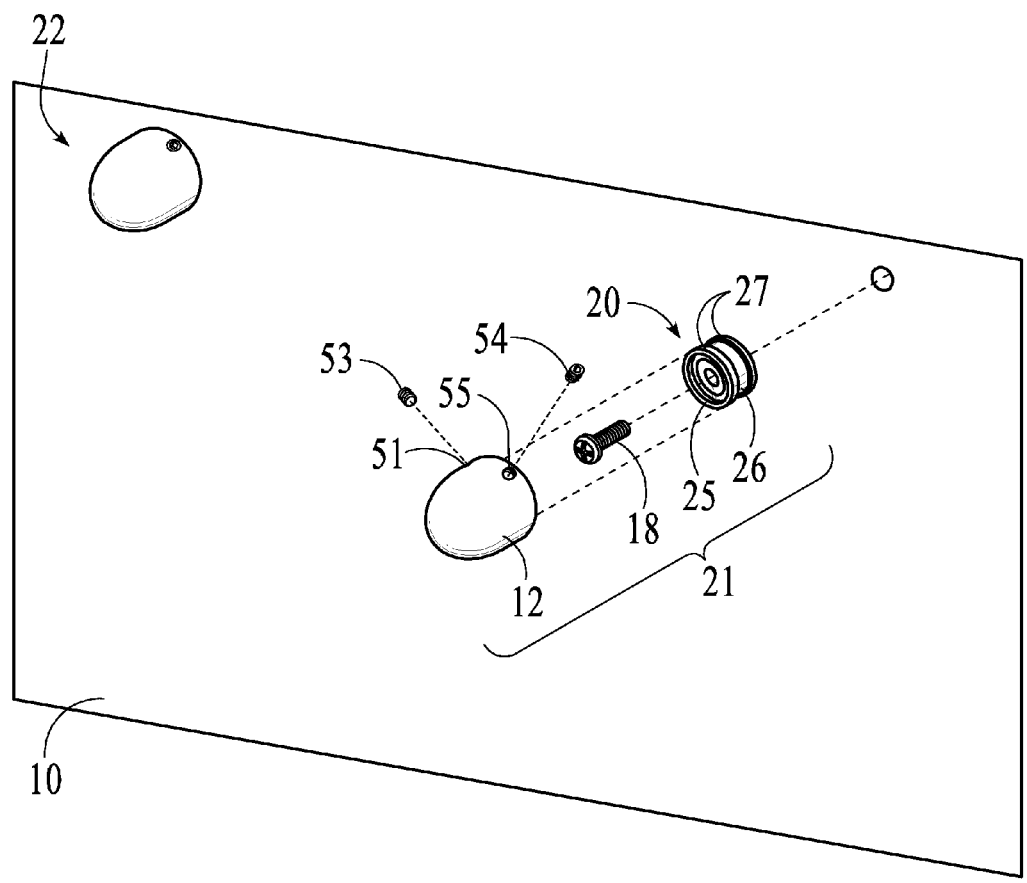
FIG. 3 show a disassembled security cover in accordance with an implementation.

FIG. 3 shows security cover 21 in a disassembled state. To assemble, a screw 18 is placed through an anchor bearing 20. Herein, screw is used generically to refer to screws, bolts or any other attachment device that uses helical threads for secure attachment. For example, screw 18 is a standard screw that may have a head shaped to receive a Phillips screwdriver or a flat head screwdriver. Alternatively, screw 18 may have another standard or non-standard shaped screw head. Screw 18 is placed through anchor bearing 20 and screwed into a threaded hole 16 in automobile 10. When tightened, screw 18 holds anchor bearing 20 tightly against license plate 10. When screw 18 is tightened, an outside perimeter 25 of anchor bearing 20 can be freely rotated.

A cap 12 covers the head of screw 18 and anchor bearing 20. At least two headless socket screws of different sizes are used to attach cap 12 to anchor bearing 20. A headless socket screw 53 is placed in a screw hole 51 and tightened until headless socket screw 53 locks into a slot 26 located between ridges 27 of outside perimeter 25 of anchor bearing 20. A headless socket screw 55 is placed in a screw hole 54 and tightened until headless socket screw 55 locks into slot 26 located between ridges 27 of outside perimeter 25 of anchor bearing 20. For example, headless socket screw 53 and headless socket screw 55 are each hex socket headless screws of different sizes. For example, headless socket screw 53 fits a $\frac{1}{16}$-inch hex wrench while headless socket screw 53 fits a $\frac{5}{64}$-inch hex wrench. Other sizes and other types of socket screws can be used. For example, a square or Robinson headless socket screw can be used, etc.

Figure 4:
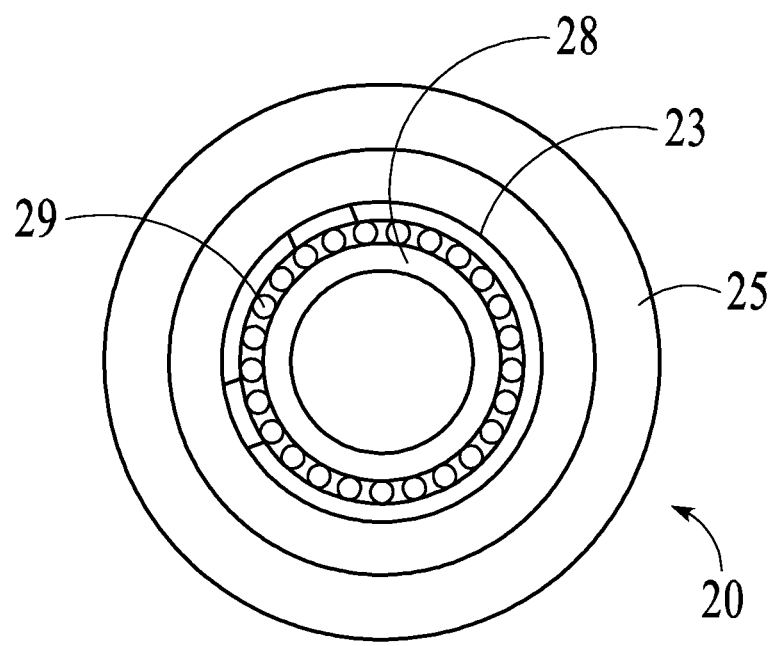
FIG. 4 shows a bearing.

FIG. 4 shows details of anchor bearing 20. An inner ring 28 is raised slightly so that screw 18 tightens against inner ring 18. Bearings 29 inside a bearing region 23 allows outside perimeter 25 to rotate freely around inner ring 28 so that even when inner ring 28 is held firmly against license plate 10 by screw 18, outside perimeter 25 can still rotate freely.

Figure 5:
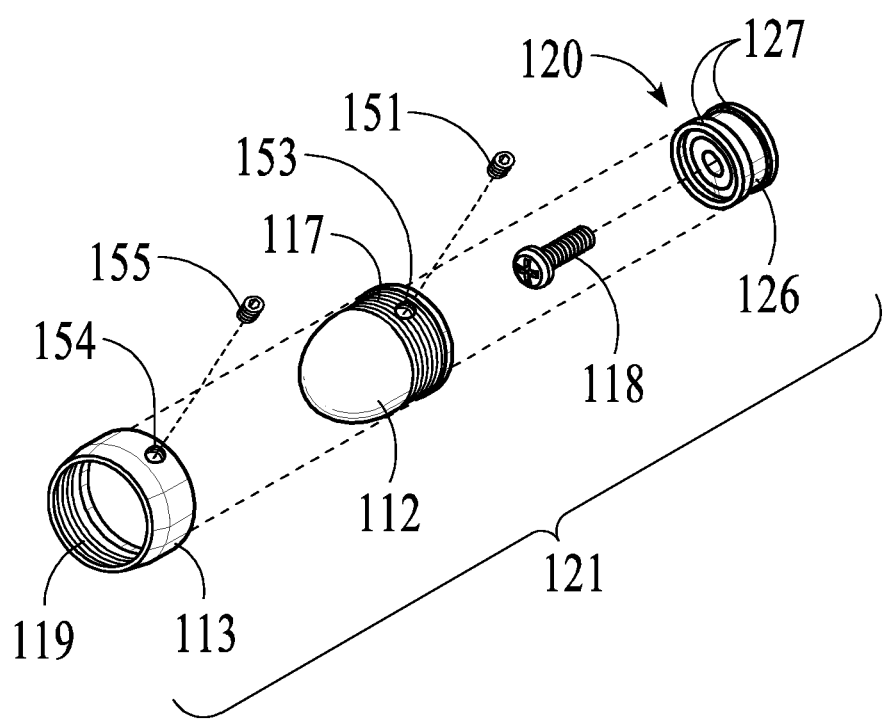
FIG. 5 shows a disassembled security cover in accordance with another implementation.

FIG. 5 shows an alternative security cover 121 in a disassembled state. To assemble, a screw 118 is placed through an anchor bearing 120. For example, screw 118 is a standard screw that may have a head shaped to receive a Phillips screwdriver or a flat head screwdriver. Alternatively, screw 118 may have another standard or non-standard shaped screw head. Screw 118 is placed through anchor bearing 120 and screwed into a threaded hole of an automobile. When tightened, screw 118 holds anchor bearing 120 tightly against the license plate. When screw 118 is tightened, an outside perimeter 125 of anchor bearing 120 can be freely rotated.

A cap 112 covers the head of screw 118 and anchor bearing 120. At least one headless socket screw is used to attach cap 112 to anchor bearing 120. A headless socket screw 153 is placed in a screw hole 151 and tightened until it locks into a slot 126 located between ridges 127 of outside perimeter 125 of anchor bearing 120.

A ring 113 is placed over cap 112. Threads 119 of ring 113 engage with threads 117 of cap 112 allowing ring 113 to be screwed tight onto cap 112. A headless socket screw 155 is placed in a screw hole 154 and tightened until it locks ring 113 to cap 112. For example, headless socket screw 153 and headless socket screw 155 are each hex socket headless screws of different sizes. For example, headless socket screw 153 fits a 1/16-inch hex wrench while headless socket screw 153 fits a 5/64-inch hex wrench. Other sizes and other types of socket screws can be used. For example, a square or Robinson headless socket screw can be used, etc.

In alternative implementations, a frame with embedded screws may be placed between license plate 10 and automobile 9 so that license plate 10 is attached to automobile 9 using nuts. Also, additional headless socket screws may be used.

Figure 6:
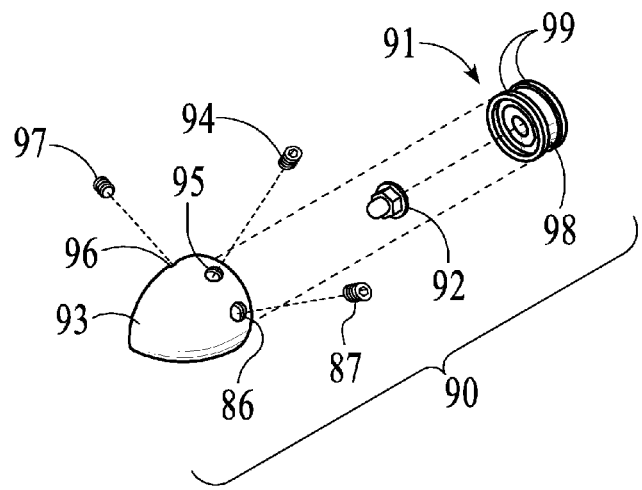
FIG. 6 shows a disassembled security cover in accordance with an implementation.

FIG. 6 shows a security cover 90 in a disassembled state. Security cover 93 has a "bullet head" shape. To assemble, a nut 92 is screwed onto a screw placed through an anchor bearing 91. When tightened, nut 92 holds anchor bearing 91 tightly against license plate 10.

Cap 93 covers the head of nut 92 and anchor bearing 91. At least two headless socket screws of different sizes are used to attach cap 93 to anchor bearing 91. A headless socket screw 94 is placed in a screw hole 95 and tightened until it locks into a slot 98 located between ridges 99 of outside perimeter 25 of anchor bearing 91. A headless socket screw 97 is placed in a screw hole 96 and tightened until it locks into slot 98 located between ridges 99 of outside perimeter 25 of anchor bearing 91. A headless socket screw 87 is placed in a screw hole 86 and tightened until it locks into slot 98 located between ridges 99 of outside perimeter 25 of anchor bearing 91. For example, headless socket screw 94, headless socket screw 97 and headless socket screw 97 are each hex socket headless screws of different sizes.

Figure 7:
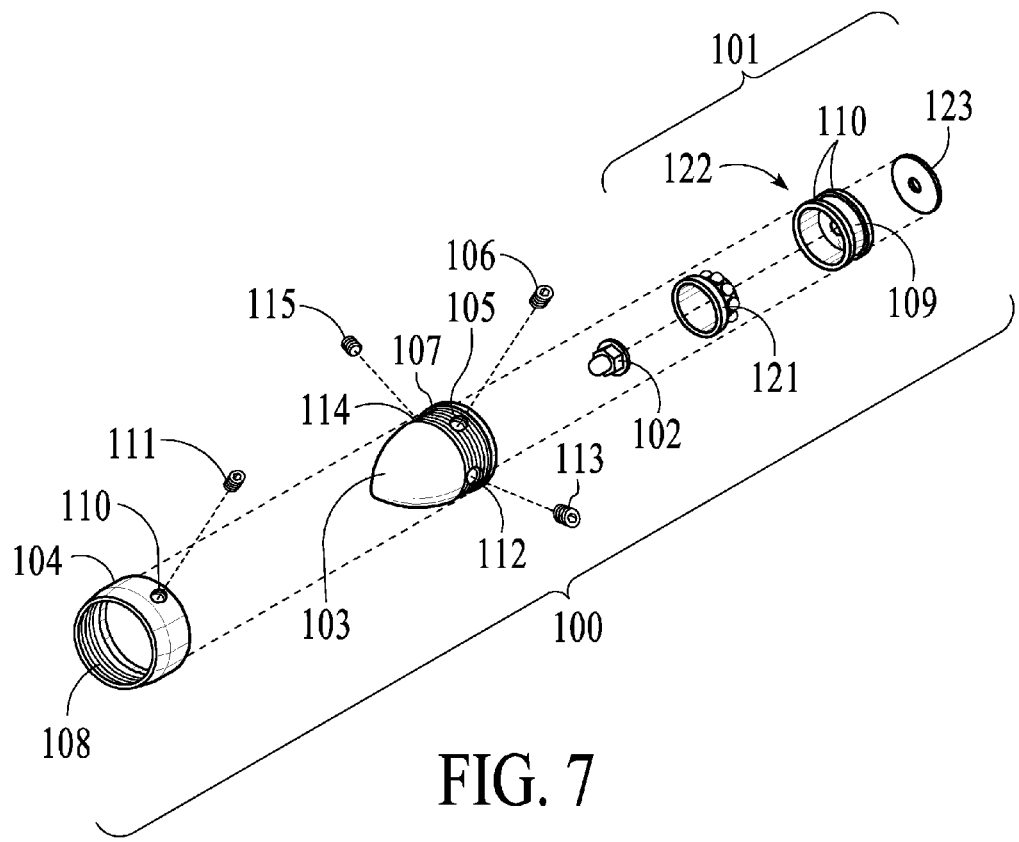
FIG. 7 shows a disassembled security cover in accordance with another implementation.

FIG. 7 shows an alternative security cover 100 in a disassembled state. To assemble, a nut 102 is screwed onto a screw extending through an anchor bearing 101. When tightened, nut 102 holds anchor bearing 101 tightly against the license plate. When nut 102 is tightened, an outside perimeter of anchor bearing 101 can be freely rotated.

Cap 103 covers the head of nut 102 and anchor bearing 101. At least one headless socket screw is used to attach cap 103 to anchor bearing 101. For example, a headless socket screw 106 is placed in a screw hole 105 and tightened until it locks into a slot 109 located between ridges 110 of the outside perimeter of anchor bearing 101. A headless socket screw 115 is placed in a screw hole 14 and tightened until it locks into a slot 109 located between ridges 110 of the outside perimeter of anchor bearing 101. A headless socket screw 113 is placed in a screw hole 112 and tightened until it locks into slot 109 located between ridges 110 of the outside perimeter of anchor bearing 101. While FIG. 7 shows three headless socket screws used to secure cap 103 to anchor bearing 101, more or fewer headless socket screws can be used.

A ring 104 is placed over cap 103. Threads 108 of ring 104 engage with threads 107 of cap 103 allowing ring 104 to be screwed tight onto cap 103. A headless socket screw 111 is placed in a screw hole 110 and tightened until it locks ring 104 to cap 103. While FIG. 7 shows one headless socket screw used to secure cap 103 to anchor bearing 101, more headless socket screws can be used For example, headless socket screw 106, headless socket screw 113, headless socket screw 115 and headless socket screw 111 are each hex socket headless screws of different sizes. This means four different size hex wrenches are necessary to access nut 102.

FIG. 7 also shows details of anchor bearing 101. Anchor bearing 101 is shown to be composed of a bearing 121, a wheel part 122 and a washer 123. Bearing 121 is pressed inside wheel part 122. The set screw for the license plate will add additional security to hold together bearing 121.

The caps disclosed herein can be used to cover screw heads, bolt heads and nuts of all sorts. For example, the caps can be used to cover acorn nuts for automobiles made by Volvo Corporation.

Figure 8A:
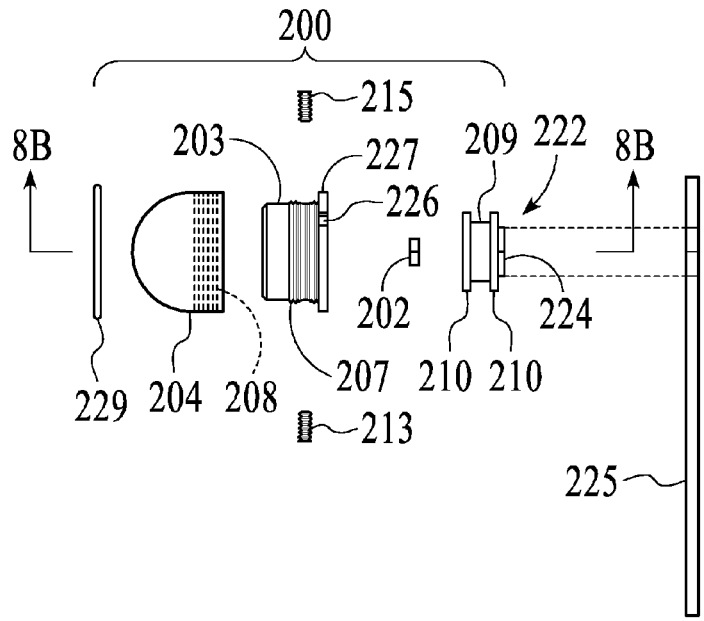
FIG. 8A and FIG. 8B shows a disassembled security cover in accordance with another implementation.
Figure 8B:
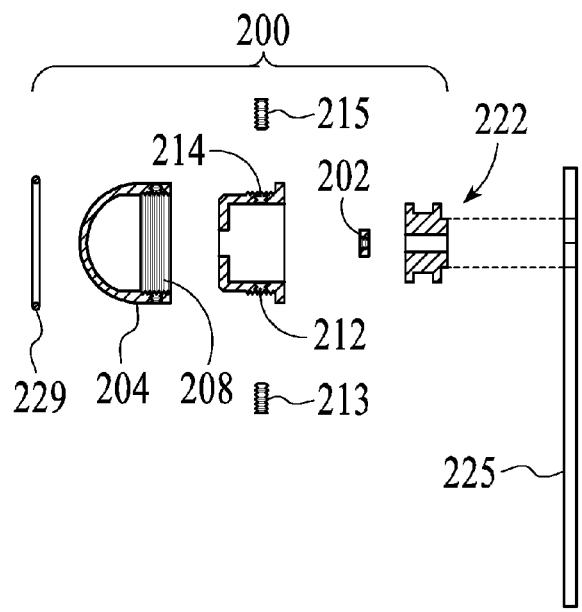

FIG. 8A shows an alternative security cover 200 in a disassembled state. FIG. 8B is a cross-sectional view of security cover 200. To assemble, a nut 202 is screwed onto a screw extending through a transparent plastic piece 225 and a wheel part 222. When tightened, nut 202 holds transparent plastic piece 225 and wheel part 222 tightly against the license plate. While nut 202 is shown as a traditional bolt, another type of fastener such as an acorn nut can be used as well. Also, instead of nut 202, in the cases where required by the configuration of the license plate holder, a fastener such as a screw can be used instead of nut 202, with the head of the screw holding wheel part 222 against transparent plastic piece 225. For example, transparent plastic piece 225 is made of Lexan™ polycarbonate material or a similar sturdy material. Plastic piece 225 is optional and is used to protect registration stickers for licenses in those states that require registration tags. Optionally, nut 202 can also be integrated into wheel part 222 so that wheel part 222 and nut 202 are manufactured as a single piece.

A ring structure 203 is attached over wheel part 222. At least one headless socket screw is used to attach ring structure 203 to wheel part 222. For example, a headless socket screw 215 is placed in a screw hole 214 and tightened until it locks into a slot 209 located between ridges 210 of the outside perimeter of wheel part 222. A headless socket screw 213 is placed in a screw hole 212 and tightened until it locks into slot 209 located between ridges 210 of the outside perimeter of wheel part 222. While FIG. 8 shows two headless socket screws used to secure ring structure 203 to wheel part 222, more or fewer headless socket screws can be used. Also, headless socket screw 213 and headless socket screw 215 are not tightened all the way through slot 209 so that ring structure 203 can rotate around wheel part 222.

A cap 204 is placed over ring structure 203. Threads 208 of cap 204 engage with threads 207 of ring structure 203 allowing cap 204 to be screwed tight onto ring structure 203. For example, threads 208 and threads 207 are reverse threaded to allow tightening in a counterclockwise direction. A headless socket screw placed in a screw hole may be used to lock cap 204 to ring structure 203.

A slot 226 in a base 227 of ring structure 203 can be used to prevent ring structure 203 rotating around wheel part 222 when tightening and untightening lock cap 204 to ring structure 203. After attaching lock cap 204 to ring structure 203, an elastic O-ring 229 is moved over locking cap 204 and placed over ring structure 203 to hide slot 226 in base 227 of ring structure 203. For example, O-ring 229 is composed of rubber or another flexible material. O-ring 229 can also be used to hold in place a label placed over locking cap 204. The label can be, for example, an American flag, a "snarley face" or any other label design chosen by the user.

Figure 9:
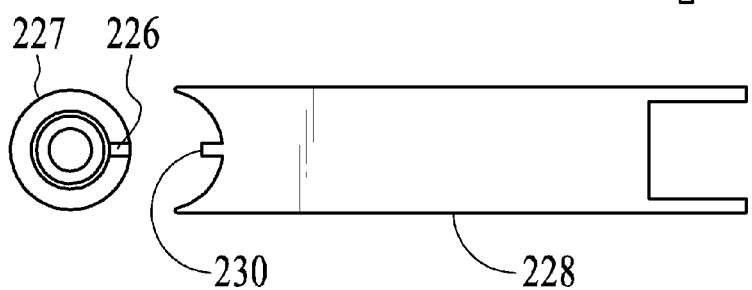
FIG. 9 shows a flat tool used to disassemble and assemble the security cover shown in FIGS. 8A and 8B in accordance with an implementation.

A special tool 228, shown in FIG. 9, includes a tab 230 that can be placed in slot 226, for example, to prevent ring structure 203 rotating around wheel part 222 when tightening and untightening lock cap 204 to ring structure 203. For example, special tool 228 is composed 1/16-inch metal.

Figure 10:
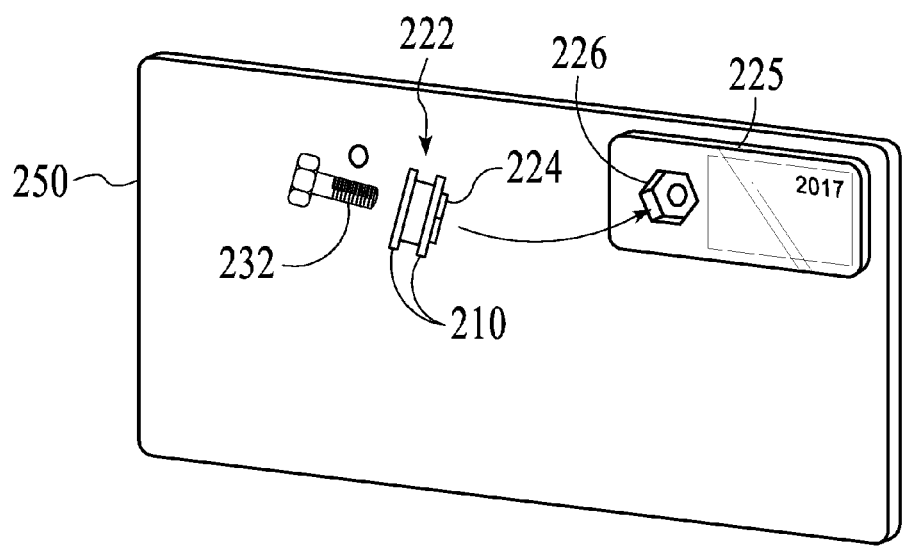
FIG. 10 shows additional details of connection between the security cover shown in FIGS. 8A and 8B and transparent plastic registration sticker tag protection.

FIG. 10 shows that a hex section 224 of wheel part 222 is placed through a matching hex hole 231 in transparent plastic piece 225. This allows transparent plastic piece 225 to be anchored in place so as to protect a registration sticker on a license plate 250. Hex section 224 prevents transparent piece 225 from rotating when wheel part 222 is attached over transparent plastic piece 225. Any other non-round shape can be used instead of hex shaped so long as the shapes are matched to provide for plastic piece 225 to be anchored in place so as to protect the registration sticker on license plate 250. For example, hex section 224 is 1/16-inch thick while transparent plastic piece 225 is 1/8 inch thick. In this configuration, a bolt 232 is used to secure wheel 222 against transparent plastic piece 225.

Figure 11:
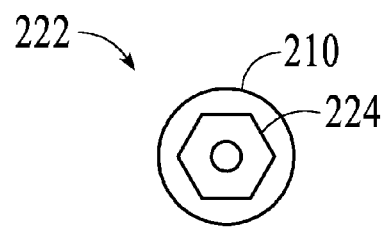
FIG. 11 shows another view of a wheel part of the security cover shown in FIGS. 8A and 8B in accordance with an implementation.

FIG. 11 shows a front view of wheel structure 222 where hex section 224 appears before a ridge 210 of wheel part 222. For example, wheel structure, including hex section 224, is manufactured as a single piece.

While cap 204 in FIG. 8 is shown shaped as a dome, another internally threaded structure could be used instead. For example, a "bullet" shaped cap could be used instead. Alternatively, a flat cap style could be used that would allow placement of a flat label, or another shape for cap 204 could be used. Also, while ring structure 203 is show open, another externally threaded structure could be used instead. For example, ring structure 203 could be replaced by a cap structure, a bullet structure or another externally threaded structure of a different shape. In this case, when cap 204 is replaced by a ring structure, a cap that is larger than the cap replacing ring structure 203 or another internally threaded structure of a different shape.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. An automobile license plate attachment device comprising:
   a wheel part that includes a slot located between two ridges at an outer circumference of the wheel part;
   a fastener that attaches the wheel part over a license plate;
   an externally threaded structure shaped to fit over and cover the wheel part when the wheel part is attached over the license plate, the externally threaded structure including at least one screw hole into which a headless socket screw can be attached to extend into the slot of the wheel part, the headless socket screw holding the externally threaded structure to the license plate; and,
   an internally threaded structure with threads matched to allow screwing the internally threaded structure on the externally threaded structure;
   wherein the externally threaded structure includes a slot into which a tool may be placed to prevent the externally threaded structure from spinning around the wheel part when the internally threaded structure is screwed on and off the externally threaded structure.

2. An automobile license plate attachment device as in claim 1, additionally comprising:
   a transparent plastic piece shaped to cover a registration sticker on the license plate, the transparent plastic piece including a non-round hole at a location where the fastener attaches the wheel part over the license plate;
   wherein the wheel part includes an extruding portion that is shaped to match the non-round hole, the extruding portion being less thick that the transparent plastic piece so that pressure exerted by the fastener upon the wheel part when the transparent plastic piece is mounted between the wheel part and the license holds the transparent plastic piece in place over the registration sticker.

3. An automobile license plate attachment device as in claim 1, additionally comprising:
   an elastic O-ring sized to be placed over the externally threaded structure to hide the slot.

4. An automobile license plate attachment device as in claim 1 wherein the non-round hole has a hexagon shape.

5. An automobile license plate attachment device as in claim 1 wherein the externally threaded structure is ring-shaped and the internally threaded structure is a dome-shaped cap.

6. An automobile license plate attachment device as in claim 1 wherein the externally threaded structure is ring-shaped and the internally threaded structure is a bullet-shaped cap.

7. An automobile license plate attachment device as in claim 1 wherein the externally threaded structure is cap and the internally threaded structure is a ring.

8. An automobile license plate attachment device as in claim 1 wherein the externally threaded structure is a first cap and the internally threaded structure is a second cap sized to fit over the first cap.

9. A license plate attachment device comprising:
   a frame having a first hole and a second hole spaced configured to match locations for placing a license plate on an automobile, the frame including a plurality of screws configured to match locations for attachment holes of the license plate; and,
   at least one license plate attachment device, wherein each of the at least one license plate attachment device includes:
      a wheel part that includes a slot located between two ridges at an outer circumference of the wheel part,
      a fastener that attaches the wheel part over a license plate to one of the plurality of screws,
      an externally threaded structure shaped to fit over and cover the wheel part when the wheel part is attached over the license plate, the externally threaded structure including at least one screw hole into which a headless socket screw can be attached to extend into the slot of the wheel part, the headless socket screw holding the externally threaded structure to the license plate, and
      an internally threaded structure with threads matched to allow screwing the internally threaded structure on the externally threaded structure;
   wherein the externally threaded structure includes a slot into which a tool may be placed to prevent the externally threaded structure from spinning around the wheel part when the internally threaded structure is screwed on and off the externally threaded structure.

10. An automobile license plate attachment device as in claim 9, additionally comprising:

a transparent plastic piece shaped to cover a registration sticker on the license plate, the transparent plastic piece including a non-round hole at a location where the fastener attaches the wheel part over the license plate;

wherein the wheel part includes an extruding portion that is shaped to match the non-round hole, the extruding portion being less thick that the transparent plastic piece so that pressure exerted by the fastener upon the wheel part when the transparent plastic piece is mounted between the wheel part and the license holds the transparent plastic piece in place over the registration sticker.

11. An automobile license plate attachment device as in claim 9, additionally comprising:

an elastic O-ring sized to be placed over the externally threaded structure to hide the slot.

12. An automobile license plate attachment device as in claim 9 wherein the non-round hole has a hexagon shape.

13. An automobile license plate attachment device as in claim 9 wherein the externally threaded structure is ring-shaped and the internally threaded structure is a dome-shaped cap.

14. An automobile license plate attachment device as in claim 9 wherein the externally threaded structure is ring-shaped and the internally threaded structure is a bullet-shaped cap.

15. An automobile license plate attachment device as in claim 9 wherein the externally threaded structure is cap and the internally threaded structure is a ring.

16. An automobile license plate attachment device as in claim 9 wherein the externally threaded structure is a first cap and the internally threaded structure is a second cap sized to fit over the first cap.

* * * * *